US012766706B2

(12) United States Patent
George et al.

(10) Patent No.: US 12,766,706 B2
(45) Date of Patent: Oct. 20, 2026

(54) SYSTEM AND METHOD FOR VISION-BASED CONTROL OF A RECONFIGURABLE SOFT ROBOTIC GRIPPER

(71) Applicant: Tata Consultancy Services Limited, Mumbai (IN)

(72) Inventors: Nijil George, Bangalore (IN); Rolif Lima, Bangalore (IN); Vighnesh Vatsal, Bangalore (IN)

(73) Assignee: Tata Consultancy Services Limited, Mumbai (IN)

( * ) Notice: Subject to any disclaimer, the term of this patent is extended or adjusted under 35 U.S.C. 154(b) by 23 days.

(21) Appl. No.: 19/205,659

(22) Filed: May 12, 2025

(65) Prior Publication Data

US 2025/0345929 A1 Nov. 13, 2025

(30) Foreign Application Priority Data

May 13, 2024 (IN) ............................ 202421037648

(51) Int. Cl.

*B25J 9/16* (2006.01)
*B25J 9/10* (2006.01)
*B25J 13/08* (2006.01)
*B25J 15/10* (2006.01)
*B25J 15/12* (2006.01)

(52) U.S. Cl.

CPC ............ *B25J 9/1612* (2013.01); *B25J 9/104* (2013.01); *B25J 9/163* (2013.01); *B25J 9/1697* (2013.01); *B25J 13/088* (2013.01); *B25J 15/103* (2013.01); *B25J 15/12* (2013.01)

(58) Field of Classification Search

CPC . B25J 9/1612; B25J 9/104; B25J 9/163; B25J 9/1697; B25J 13/088; B25J 15/103; B25J 15/12; B25J 15/0009; B25J 15/10

See application file for complete search history.

(56) References Cited

U.S. PATENT DOCUMENTS

| | | | | |
|---|---|---|---|---|
| 10,099,388 | B1 | 10/2018 | Kozlowski et al. | |
| 11,473,942 | B2 * | 10/2022 | Shepherd | G02B 6/10 |
| 11,788,869 | B2 * | 10/2023 | Shepherd | G02B 6/02033 250/227.14 |
| 2019/0056248 | A1 * | 2/2019 | Shepherd | G01D 5/35345 |
| 2022/0126442 | A1 | 4/2022 | Wen et al. | |

(Continued)

*Primary Examiner* — Bhavesh V Amin

(74) *Attorney, Agent, or Firm* — Finnegan, Henderson, Farabow, Garrett & Dunner LLP

(57) ABSTRACT

The present disclosure provides a vision based control of a reconfigurable soft robotic gripper. Conventional methods lack an intelligent control method which automatically adapts the configuration of the gripper based on the target object. The present disclosure includes a robotic gripper with a rigid palm and three soft fingers attached to the palm. Each finger is separately actuated using three separate motors. Out of the three fingers, one is fixed, and other two can move relative to the base, the motion of the movable fingers is actuated by motor(s). Each finger has multiple sensors to detect the magnitude of bending. A camera is attached to the base of the gripper, facing the object to be grasped. The camera image and the sensors measurements are given to a control unit and the control unit in turn gives the control signal to the actuator motors to suit the object to be grasped.

5 Claims, 14 Drawing Sheets

(56) References Cited

U.S. PATENT DOCUMENTS

| | | | | |
|---|---|---|---|---|
| 2023/0003558 | A1* | 1/2023 | Shepherd | G02B 6/10 |
| 2023/0321817 | A1 | 10/2023 | Do et al. | |
| 2026/0123620 | A1* | 5/2026 | Reyntjens | A01M 3/007 |

* cited by examiner

SYSTEM AND METHOD FOR VISION-BASED CONTROL OF A RECONFIGURABLE SOFT ROBOTIC GRIPPER

PRIORITY CLAIM

This U.S. patent application claims priority under 35 U.S.C. § 119 to: Indian patent application Ser. No. 20/242,1037648, filed on May 13, 2024. The entire contents of the aforementioned application are incorporated herein by reference.

TECHNICAL FIELD

The disclosure herein generally relates to the field of robotics and material handling and, more particularly, to a system and method for vision-based control of a reconfigurable soft robotic gripper.

BACKGROUND

Robotic gripper forms an end-effector of a robotic manipulator. Robotic manipulators find application in all areas of automation where they are required to handle physical objects. Objects can be classified based on their shape, size, and physical properties (compliance, fragility, etc.). However, diverse types of objects require distinct types of grippers. This necessitates the grippers to be changed intermittently to handle objects of different classes, leading to overhead time in change of end-effector and having to maintain multiple grippers. Businesses which face such issues include retailers, grocery stores and warehouses, where the objects are not of a single class.

Most grippers which are available currently are specific to a certain type of object. The grippers can broadly be classified into rigid and soft types based on the material of make. Rigid grippers are good for precise manipulation of objects and fail when they have to deal with fragile and compliant objects (e.g. chips packets and eggshells). Soft grippers on the other hand are harder to control but they enable the manipulation of compliant and fragile objects. Grippers can be further classified based on the configuration of their fingers. For example, certain configurations favor certain shapes. However, it is highly challenging to create a single gripper which can adapt itself to the objects it has to handle.

SUMMARY

Embodiments of the present disclosure present technological improvements as solutions to one or more of the above-mentioned technical problems recognized by the inventors in conventional systems. For example, in one embodiment, a method for machine learning model testing and preventive measure recommendation is provided. The method includes receiving, by one or more hardware processors, a data pertaining to an object grasping environment, wherein the data comprises a current sequence of images pertaining to an object to be grasped, a plurality of sensor data associated with the plurality of flex sensors mounted in a plurality of fingers of a reconfigurable robotic gripper. Further, the method includes computing, by the one or more hardware processors, a position the object to be grasped based on the current sequence of images pertaining to the object to be grasped. Furthermore, the method includes simultaneously computing, by the one or more hardware processors, a current magnitude of bending and a current configuration associated with each of the plurality of fingers based on the plurality of sensor data. Furthermore, the method includes iteratively computing, by the one or more hardware processors, an optimal grasp control signal based on the position of the object to be grasped, the current configuration and the current magnitude of bending associated with the each of the at least three fingers using a trained reward based Reinforcement Learning (RL) model. Finally, the method includes grasping, by the reconfigurable robotic gripper, the object to be grasped based on the optimal grasp control signal, wherein gripper action is performed by actuating a motor associated to each of the plurality of fingers based on the optimal grasp control signal.

In another aspect, a reconfigurable robotic gripper is provided, the reconfigurable robotic gripper comprising at least three fingers and a rigid palm, wherein the at least three fingers are attached to the rigid palm, wherein each of the at least three fingers is fully 3D printed using a soft material, wherein each of the at least three fingers is actuated independently using one or more cables connected to a shaft of a motor associated with each of the at least three fingers, wherein, one among the at least three fingers is fixed, and the other fingers are movable relative to a base, wherein motion of the fingers that are movable is actuated by the associated motor, wherein each finger from among the at least three fingers comprises a plurality of flex sensors to detect a magnitude of bending, and wherein an image capturing device capable of capturing a sequence of images is attached to the base of the gripper, facing the object to be grasped.

In yet another aspect, a computer program product including a non-transitory computer-readable medium having embodied therein a computer program for system and method for vision-based control of a reconfigurable soft robotic gripper is provided. The computer readable program, when executed on a computing device, causes the computing device to receive a data pertaining to an object grasping environment, wherein the data comprises a current sequence of images pertaining to an object to be grasped, a plurality of sensor data associated with the plurality of flex sensors mounted in a plurality of fingers of a reconfigurable robotic gripper. Further, the computer readable program, when executed on a computing device, causes the computing device to compute a position the object to be grasped based on the current sequence of images pertaining to the object to be grasped.

Furthermore, the computer readable program, when executed on a computing device, causes the computing device to simultaneously compute a current magnitude of bending and a current configuration associated with each of the plurality of fingers based on the plurality of sensor data. Furthermore, the computer readable program, when executed on a computing device, causes the computing device to iteratively compute an optimal grasp control signal based on the position of the object to be grasped, the current configuration and the current magnitude of bending associated with the each of the at least three fingers using a trained reward based Reinforcement Learning (RL) model. Finally, the computer readable program, when executed on a computing device, causes the computing device to grasp, by the reconfigurable robotic gripper, the object to be grasped based on the optimal grasp control signal, wherein gripper action is performed by actuating a motor associated to each of the plurality of fingers based on the optimal grasp control signal.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Figure 1:
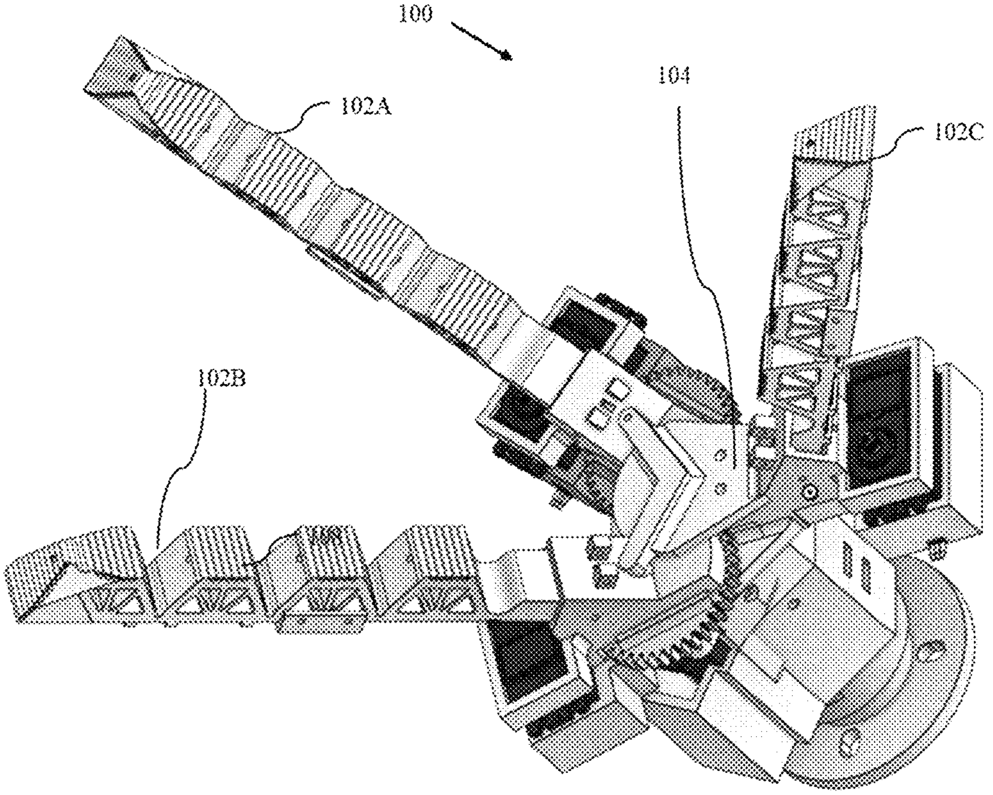
FIG. 1 illustrates front view of the reconfigurable soft robotic gripper, in accordance with some embodiments of the present disclosure.

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims.

In conventional methods, there are references to reconfigurable soft grippers but the incorporation of an intelligent control method which automatically adapts the configuration of the gripper based on the position of the target object is not available in the art.

To overcome the challenges of the conventional approaches, embodiments herein provide a system and method for vision-based control of a reconfigurable soft robotic gripper to pick heterogenous objects of varying textures. The present disclosure includes a robotic gripper with a rigid palm and three soft fingers attached to the palm. Each finger is separately actuated using cables which are connected to the shafts of three separate motors (one for each finger). Out of the three fingers, one is fixed, while the other two can move relative to the base, the motion of the movable fingers is actuated by motor(s). Each finger has multiple sensors affixed to it which detect the magnitude of bending (or flexing). There is a camera attached to the base of the gripper, facing the object to be grasped. The camera image (video) and the sensors measurements are given to a control unit (microcontroller, microprocessor, or computer) and the control unit in turn gives the control signal to the actuator motors. The control unit runs software which takes as input the image taken by the camera and the sensor measurements and outputs the corresponding control signal to the individual motors for actuation. The software adapts the hardware (by reconfiguration) to suit the object to be grasped.

Referring now to the drawings, and more particularly to FIGS. 1 through 13, where similar reference characters denote corresponding features consistently throughout the figures, there are shown preferred embodiments, and these embodiments are described in the context of the following exemplary system and/or method.

FIG. 1 illustrates the front view of the reconfigurable soft robotic gripper, in accordance with some embodiments of the present disclosure. The reconfigurable soft robotic gripper 100 includes at least three fingers (102A, 102B, and 102C) and a rigid palm 104. The at least three fingers 102A, 102B, and 102C are attached to the rigid palm 104 (also hereinafter referred to as "palm 104"). Each of the at least three fingers 102A, 102B and 102C is fully 3D printed using a soft material. For example, the soft material used is Thermoplastic polyurethane (TPU).

Each of the at least three fingers 102A, 102B and 102C are actuated independently using cables connected to a shaft associated with a motor corresponding to each of the at least three fingers 102A, 102B and 102C. One among the at least three fingers 102A, 102B and 102C is fixed, and the other fingers are movable relative to a base. Motion of the movable fingers is actuated by the associated motor. Each finger from among the at least three fingers 102A, 102B and 102C includes a plurality of flex sensors to detect a magnitude of bending. An image capturing device (not shown in FIG. 1) capable of capturing a sequence of images is attached to the base of the gripper, facing the object to be grasped.

Figure 2A:
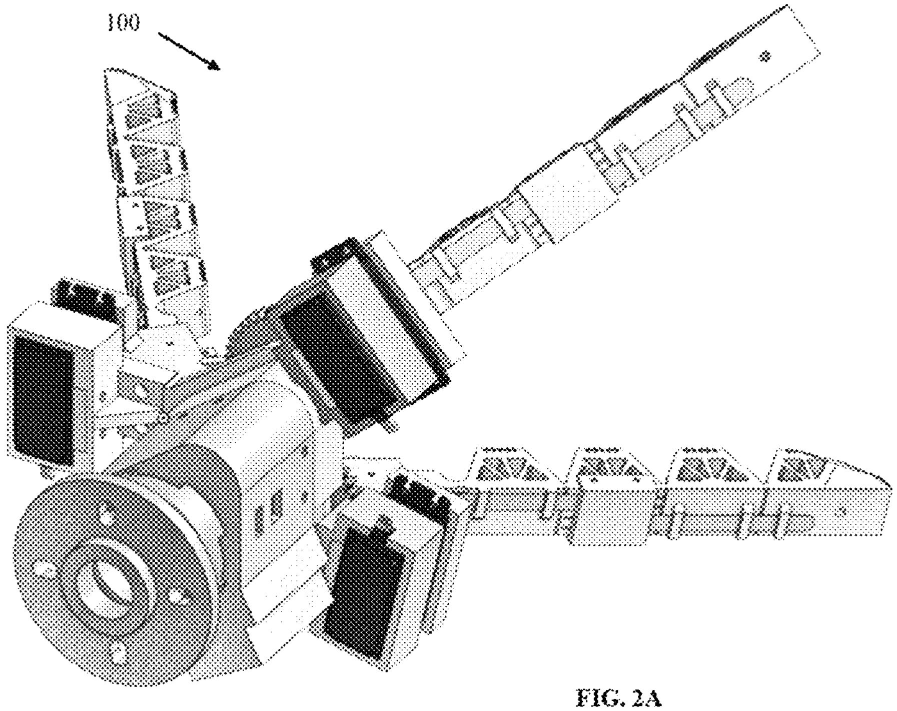
FIG. 2A illustrates rear view of the reconfigurable soft robotic gripper, in accordance with some embodiments of the present disclosure.
Figure 2B:
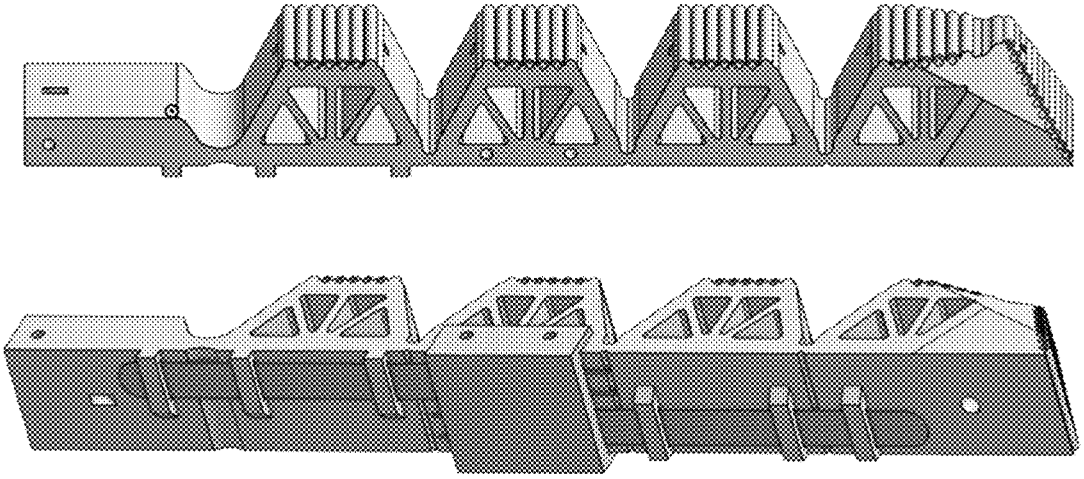
FIG. 2B illustrates example structure of fingers of the reconfigurable soft robotic gripper, in accordance with some embodiments of the present disclosure.

FIG. 2A illustrates rear view of the reconfigurable soft robotic gripper, in accordance with some embodiments of the present disclosure. FIG. 2B illustrates example structure of fingers of the reconfigurable soft robotic gripper, in accordance with some embodiments of the present disclosure.

Figure 3:
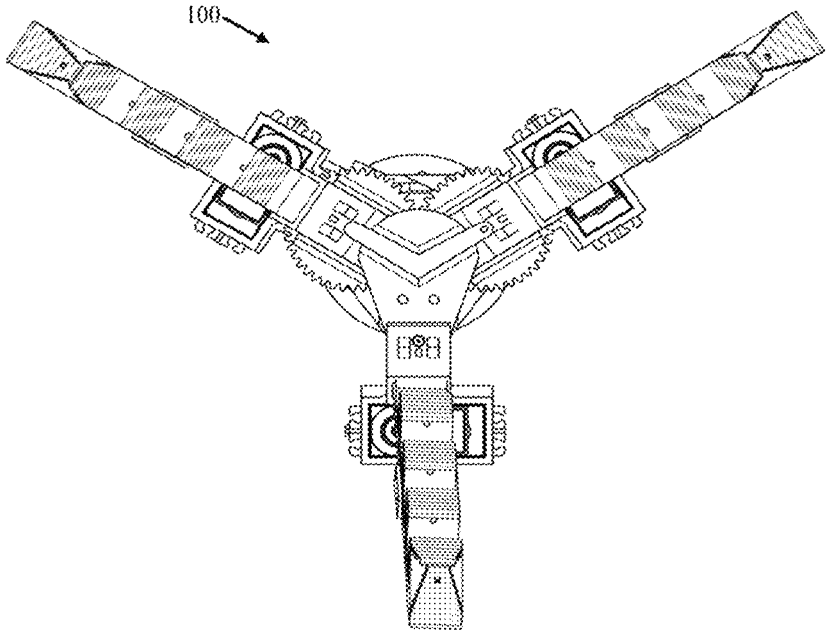
FIG. 3 illustrates 'Y' configuration of the reconfigurable soft robotic gripper, in accordance with some embodiments of the present disclosure.

FIG. 3 illustrates 'Y' configuration of the reconfigurable soft robotic gripper, in accordance with some embodiments of the present disclosure. For example, 'Y' configuration allows the gripper 100 to perform spherical grasps. These 'Y' configurations are suited for objects that are having similar size in all dimensions. This includes objects which has spherical or cubic shapes.

Figure 4:
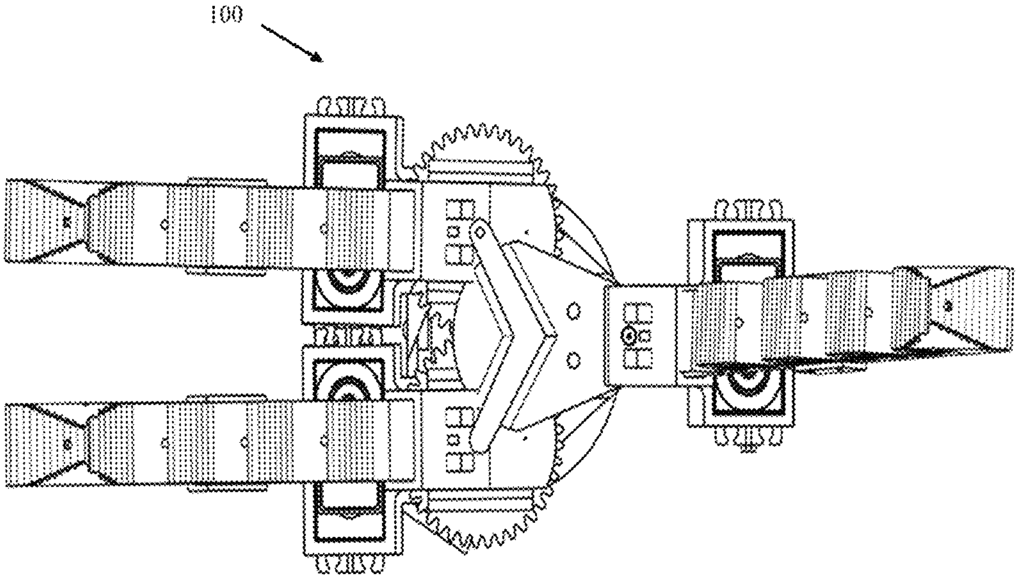
FIG. 4 illustrates parallel configuration of the reconfigurable soft robotic gripper, in accordance with some embodiments of the present disclosure.

FIG. 4 illustrates parallel configuration of the reconfigurable soft robotic gripper, in accordance with some embodiments of the present disclosure. For example, the parallel configuration enables the gripper to perform cylindrical grasps and the parallel configuration fingers are suited for objects that are having one of the dimension larger than the other two. This includes objects like cylinders and tall cuboids.

Figure 5:
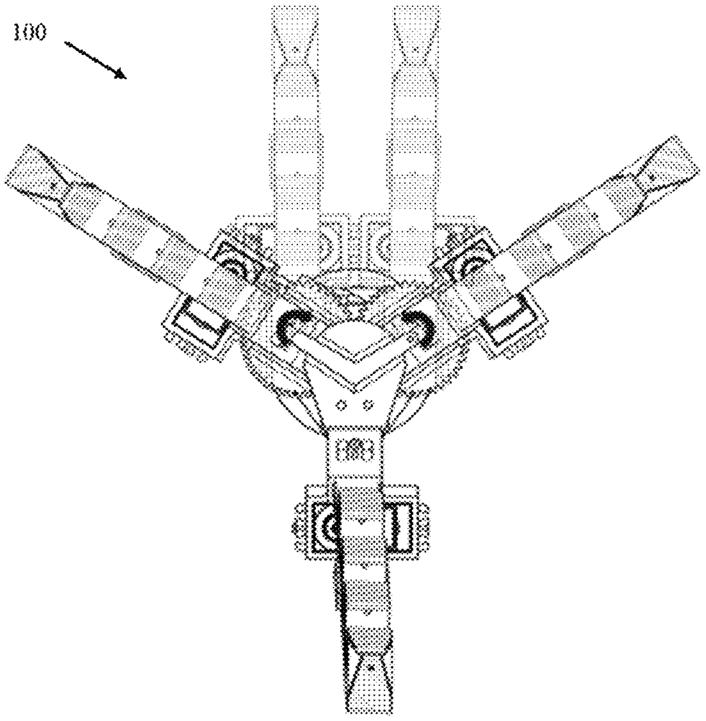
FIG. 5 illustrates changing of soft robotic fingers of the reconfigurable soft robotic gripper from 'Y' configuration to parallel configuration, in accordance with some embodiments of the present disclosure.

FIG. 5 illustrates changing of soft robotic fingers of the reconfigurable soft robotic gripper from 'Y' configuration to parallel configuration, in accordance with some embodiments of the present disclosure. For example, If the object to be grasped is having one of the dimension larger than the other two then cylindrical grasp is best suited. Parallel configuration enables the gripper to perform cylindrical grasps. Examples of such objects are cylindrical objects like bottles and cuboidal boxes which are tall. Thus, if the gripper is in 'Y' configuration for grasping a spherical or cubic object at current stage, and a requirement arises to grasp a cylindrical or tall cuboidal object in the subsequent stage, then the configuration of gripper 100 is changed automatically from 'Y' configuration to parallel configuration using the trained reward based Reinforcement Learning (RL) model.

Figure 6:
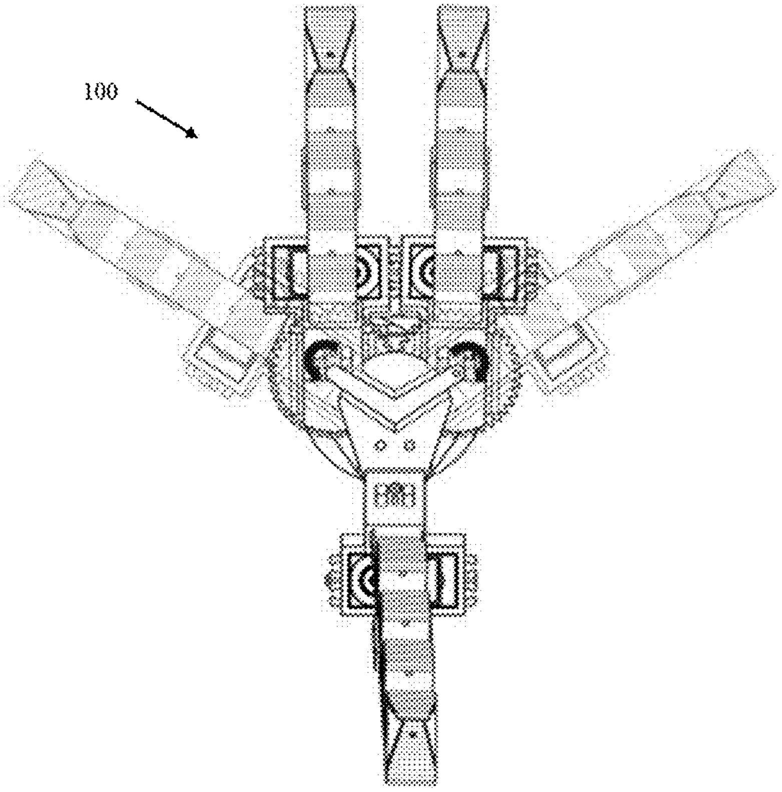
FIG. 6 illustrates changing of soft robotic fingers of the reconfigurable soft robotic gripper from parallel configuration to 'Y' configuration, in accordance with some embodiments of the present disclosure.

FIG. 6 illustrates changing of soft robotic fingers of the reconfigurable soft robotic gripper from parallel configuration to 'Y' configuration, in accordance with some embodiments of the present disclosure. For example, if the object to be grasped has all the dimensions of similar magnitude, then spherical grasp/'Y' configuration is best suited. Y configuration enables the gripper to perform Spherical grasps. Examples of such objects are objects like fruits like apples and oranges and spherical objects like balls or cubic objects. Thus, if the gripper 100 is in parallel configuration for grasping cuboidal or cylindrical objects at current stage, and a requirement arises to grasp a spherical or cubic object in the subsequent stage, then the configuration of gripper 100 is changed from parallel configuration to 'Y' configuration using the trained reward based RL model.

Figure 7:
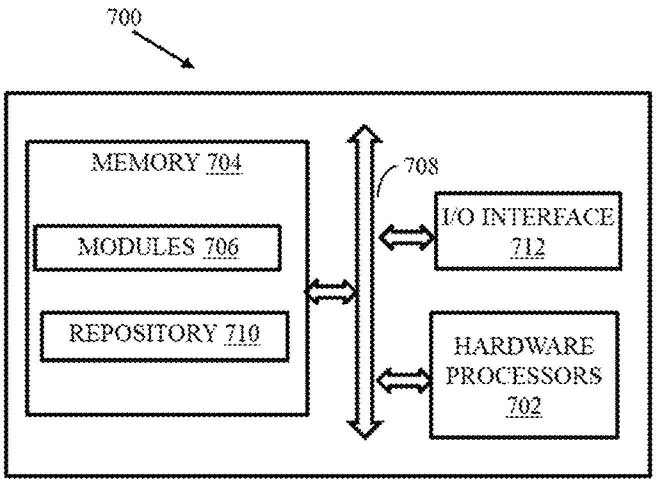
FIG. 7 is a functional block diagram of a system associated with the apparatus shown in FIG. 1A for executing a method for picking or grasping an object, according to some embodiments of the present disclosure.

The gripper 100 further comprises a system 700 (not shown in FIG. 1), for executing the associated method 800 for the vision-based control of a reconfigurable soft robotic gripper. FIG. 7 is a functional block diagram of the system associated with the apparatus shown in FIG. 1 for executing a method for vision-based control of a reconfigurable soft robotic gripper, according to some embodiments of the present disclosure.

The system 700 includes a memory 704, one or more hardware processors 702, wherein the one or more hardware processors 702 may be either integrated within the packing apparatus 100, or connected to the packing apparatus 100 through an external interfaces. It may be understood that the memory 704, the one or more hardware processors 702, and/or one or more communication interfaces 708 may be comprised in the packing apparatus 100. The hardware processors 702, memory 704, and the Input/Output (I/O) interface 712 may be coupled by a system bus such as a system bus 708 or a similar mechanism.

The memory 704 may store instructions, any number of pieces of information, and data (e.g., a dimension, an orientation and a tracking code of each of the plurality of 3D objects), captured by the electronic device (e.g., a vision sensor), for example to implement the functions of the device 100. The memory 704 may include for example, volatile memory and/or non-volatile memory. Examples of volatile memory may include, but are not limited to volatile random access memory (RAM). The non-volatile memory may additionally or alternatively comprise an electrically erasable programmable read only memory (EEPROM), flash memory, hard drive, or the like. Some examples of the volatile memory includes, but are not limited to, random access memory, dynamic random access memory, static random access memory, and the like. Some example of the non-volatile memory includes, but are not limited to, hard disks, magnetic tapes, optical disks, programmable read only memory, erasable programmable read only memory, electrically erasable programmable read only memory, flash memory, and the like. The memory may be configured to store information, data, instructions or the like for enabling the apparatus 100 to carry out various functions in accordance with various example embodiments.

Additionally or alternatively, memory 704 may be configured to store programmed instructions which when executed by the one or more hardware processors causes the packing apparatus 100 to behave in a manner as described in various embodiments. The memory stores the functional modules and information, for example, information (e.g., position of the object to be grasped and orientation of each of the plurality of fingers) received from the plurality of flex sensor and the image capturing device.

The one or more hardware processors 702 may be implemented as one or more microprocessors, microcontrollers, digital signal processors, central processing units, state machines, logic circuitries, and/or any devices that manipulate signals based on operational instructions. Further, the hardware processor may comprise a multi-core architecture. Among other capabilities, the hardware processor is configured to fetch and execute machine-readable instructions or modules stored in the memory. The hardware processor may include circuitry implementing, among others, audio and logic functions associated with the communication. For example, the hardware processor may include, but are not limited to, one or more digital signal processors (DSPs), one or more microprocessor, one or more special-purpose machine chips, one or more field-programmable gate arrays (FPGAs), one or more Application Specific Integrated Circuits (ASICs), one or more machine(s), various analog to digital converters, digital to analog converters, and/or other support circuits.

The one or more hardware processors 702 thus may also include the functionality to encode messages and/or data or information. The hardware processor may include, among others a clock, an Arithmetic Logic Unit (ALU) and logic gates configured to support operation of the hardware processor. Further, the hardware processor may include functionality to execute one or more software programs, which may be stored in the memory or otherwise accessible to the hardware processor.

The I/O interface 712 may include a variety of software and hardware interfaces, for example, a web interface, a graphical user interface, and the like. The I/O interface 712 may include a variety of software and hardware interfaces, for example, interfaces for peripheral device(s), such as a keyboard, a mouse, an external memory, a printer and the like. Further, the interface 712 may enable the system 700 to communicate with other devices, such as web servers and external databases.

The I/O interface 712 can facilitate multiple communications within a wide variety of networks and protocol types, including wired networks, for example, local area network (LAN), cable, etc., and wireless networks, such as Wireless LAN (WLAN), cellular, or satellite. For the purpose, the I/O interface 712 may include one or more ports for connecting a number of computing systems with one another or to another server computer. The I/O interface 712 may include one or more ports for connecting a number of devices to one another or to another server.

The plurality of modules 706 include programs or coded instructions that supplement applications or functions performed by the system 100 for packing heterogeneous objects. The plurality of modules 106, amongst other things, can include routines, programs, objects, components, and data structures, which performs particular tasks or implement particular abstract data types. The plurality of modules 106 may also be used as, signal processor(s), state machine (s), logic circuitries, and/or any other device or component that manipulates signals based on operational instructions. Further, the plurality of modules 706 can be used by hardware, by computer-readable instructions executed by the one or more hardware processors 702, or by a combination thereof. The plurality of modules 706 can include various sub-modules (not shown). The plurality of modules 706 may include computer-readable instructions that supplement applications or functions performed by the system 100 for packing heterogeneous objects.

The data repository 710 may include a plurality of abstracted piece of code for refinement and data that is processed, received, or generated as a result of the execution of the plurality of modules in the module(s) 706. Although the data repository 710 is shown internal to the system 700, it will be noted that, in alternate embodiments, the data repository 110 can also be implemented external to the system 700, where the data repository 710 may be stored within a database (not shown in FIG. 1) communicatively coupled to the system 700. The data contained within such external database may be periodically updated. For example, new data may be added into the database (not shown in FIG. 7), and/or existing data may be modified and/or non-useful data may be deleted from the database (not shown in FIG. 7). In one example, the data may be stored in an external system, such as a Lightweight Directory Access Protocol (LDAP) directory and a Relational Database Management System (RDBMS).

The programmed instructions stored in the memory 704 when executed by the one or more hardware processors 702 causes gripper 100 to receive the data pertaining to the object grasping environment. Further, the programmed instructions stored in the memory when executed by the one or more hardware processors causes the gripper 100 to compute a position of the object to be grasped based on a current sequence of images pertaining to the object to be grasped.

Further, the programmed instructions stored in the memory when executed by the one or more hardware processors 702 causes the gripper 100 to simultaneously compute a current magnitude of bending and the current configuration of the at least three fingers associated with each of a plurality of fingers (the at least three fingers) based on the plurality of sensor data.

Further, the programmed instructions stored in the memory when executed by the one or more hardware processors 702 causes the gripper 100 to iteratively compute an optimal grasp control signal based on the dimension associated with the object to be grasped, the position of the object to be grasped and the current magnitude of bending associated with the each of the plurality of fingers using a trained reward based Reinforcement Learning (RL) model.

Further, the programmed instructions stored in the memory when executed by the one or more hardware processors 702 causes the gripper 100 to grasp the object to be grasped based on the optimal grasp control signal, wherein gripper action is performed by actuating an associated motor connected to each of the plurality of fingers based on the optimal grasp control signal.

Figure 8:
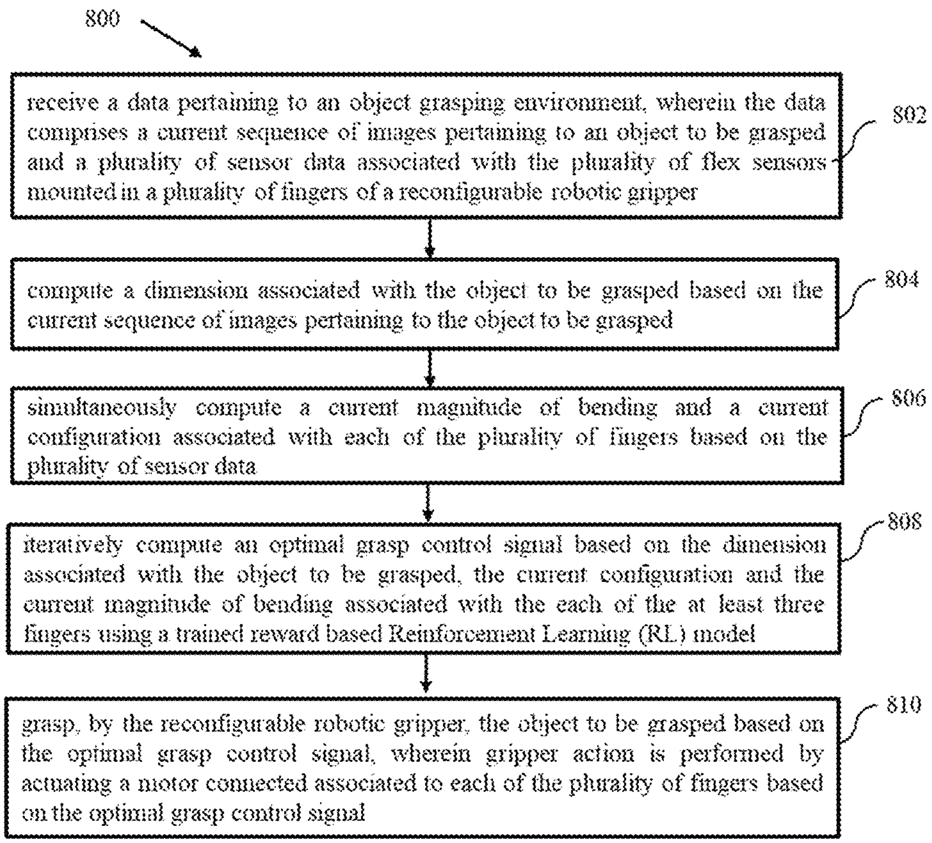
FIG. 8 is an exemplary flow diagram illustrating a processor implemented method for vision-based control of a reconfigurable soft robotic gripper with reference to FIGS. 1 through 6, in accordance with some embodiments of the present disclosure.

FIG. 8 is an exemplary flow diagram illustrating a processor implemented method for vision-based control of a reconfigurable soft robotic gripper with reference to FIGS. 1 through 6, in accordance with some embodiments of the present disclosure. In an embodiment, the system 700 comprises one or more data storage devices or the memory operatively coupled to the one or more hardware processor (s) and is configured to store instructions for execution of steps of the method 800 by the one or more hardware processors. The steps of the method 800 of the present disclosure will now be explained with reference to the components or blocks of the system 700 as depicted in FIG. 7 and the steps of flow diagram as depicted in FIG. 8. The method 800 may be described in the general context of computer executable instructions. Generally, computer executable instructions can include routines, programs, objects, components, data structures, procedures, modules, functions, etc., that perform particular functions or implement particular abstract data types. The method 800 may also be practiced in a distributed computing environment where functions are performed by remote processing devices that are linked through a communication network. The order in which the method 800 is described is not intended to be construed as a limitation, and any number of the described method blocks can be combined in any order to implement the method 800, or an alternative method. Furthermore, the method 800 can be implemented in any suitable hardware, software, firmware, or combination thereof.

At step 802 of method 800, the one or more hardware processors 702 are configured by the programmed instructions to receive a data pertaining to an object grasping environment. The data includes a current sequence of images (video) pertaining to an object to be grasped and a plurality of sensor data associated with the plurality of flex sensors mounted in at least three fingers 102A, 102B and 102C (a plurality of fingers) of the reconfigurable robotic gripper 100. The flex sensors measure the magnitude of bent in each finger of the gripper 100.

At step 804 of the method 800, the one or more hardware processors 702 are configured by the programmed instructions to compute a position of the object to be grasped based on the current sequence of images pertaining to the object to be grasped. Here, the position indicates a best position in conjunction with the orientation of the gripper to successfully grab the object. For example, the position associated with the object to be grasped is computed using a neural network which takes as input the video image frames. The neural network is trained on objects from a 3D grocery object dataset.

At step 806 of the method 800, the one or more hardware processors 702 are configured by the programmed instructions to simultaneously compute a current magnitude of bending and the current configuration associated with each of the at least three fingers based on the plurality of sensor data. The current configuration is calculated analytically from the joint angle value of the motor that controls the change in configuration.

For example, the current magnitude of bending is predicted using a neural network which takes as input the video image frames and the flex sensor measurements. The weights of the neural network are arrived at through training of the RL model in simulation. Subsequently the trained model is subjected to sim2real techniques like domain randomization and domain adaptation which enables it to perform the same function which it had done in simulation in real life. During RL training an appropriate reward function is used which gave a higher reward when the object was successfully grasped and lifted to a certain height, the reward was acquired by the model only if the gripper was able to maintain the object in its grasp without slipping for a specified amount of time.

At step 808 of the method 800, the one or more hardware processors 702 are configured by the programmed instructions to iteratively compute an optimal grasp control signal based on the dimension associated with the object to be grasped, the current configuration of the plurality of fingers and the current magnitude of bending associated with the each of the at least three fingers using a trained reward based Reinforcement Learning (RL) model.

For example, the reward based RL model is trained in simulation and then the learned model is transferred to the physical system using sim2real transfer techniques like domain adaptation and domain randomization. The RL model is trained in a simulation environment (PyBullet, Nvidia Isaac Sim) which has a physics engine running in the backend. The simulation environment is set up to give the real-time image captured by a virtual camera and an estimated measure of the bending of the plurality of fingers. The gripper repeatedly tries to grab a random object spawned in front of it and gets a higher reward if it can raise it above the ground and maintain the grasp.

Figure 9:
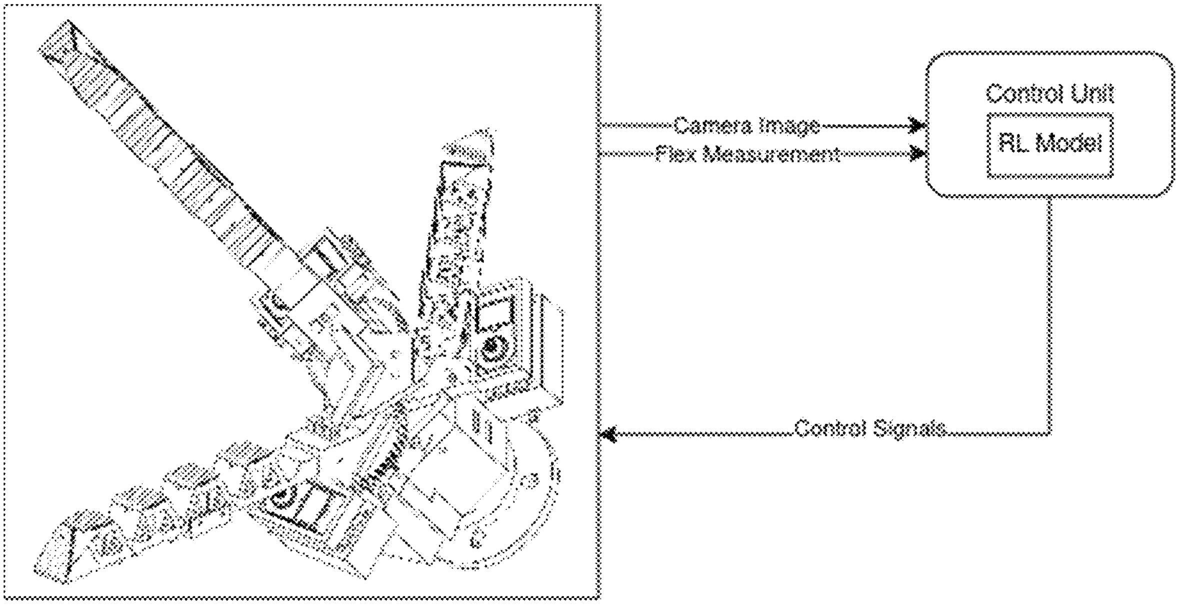
FIG. 9 illustrates an overall block diagram for vision-based control of a reconfigurable soft robotic gripper, in accordance with some embodiments of the present disclosure.

FIG. 9 illustrates an overall block diagram for vision-based control of a reconfigurable soft robotic gripper, in accordance with some embodiments of the present disclosure. Now referring to FIG. 9, the input to the RL model includes the image/video from the camera and the measurements from the flex sensors. The camera mounted on the gripper takes in the image (video) of the object to be grasped and sends it to the RL model, allowing the RL model to understand the physical characteristics of the target object. Also, the flex sensor measurements provide the amount of instantaneous finger deformation. The RL model outputs the control signals for the four motors. The opening and the closing of the gripper is done by actuating the motors connected to the three fingers and the reconfiguration of the gripper is done using the fourth motor. The control signals given by the RL model are such that the gripper will close around the object leading to a successful grasp. The RL model also gives the control signal to the motor used for reconfiguration such that the gripper configuration matches the favored configuration for the shape of the target object.

Figure 10:
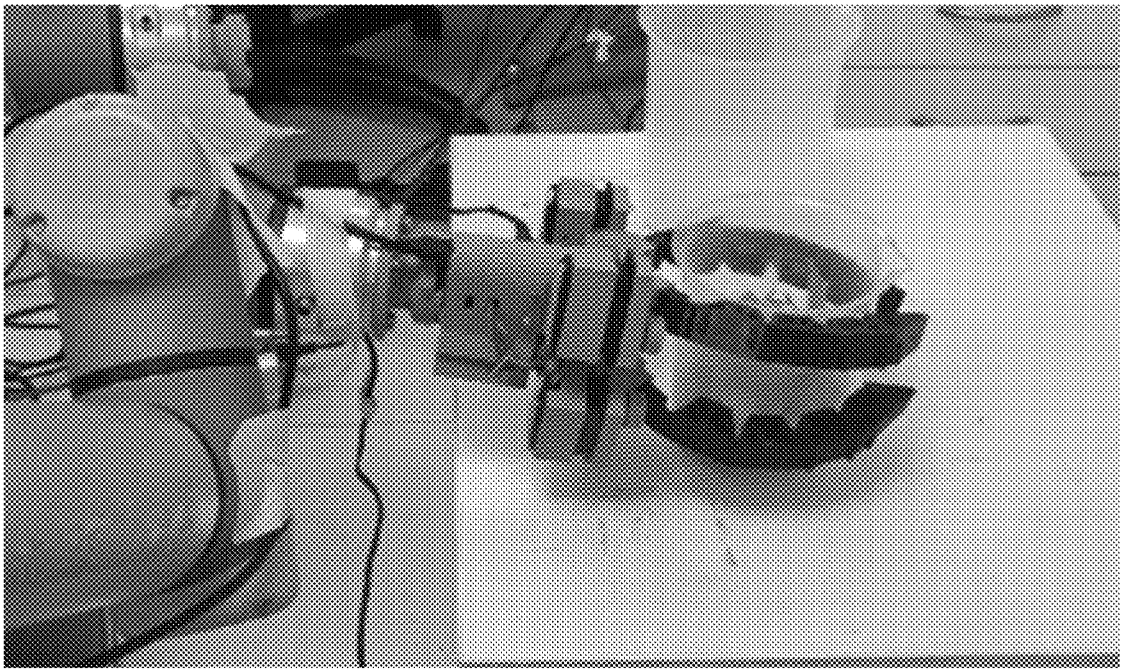
FIG. 10 and FIG. 11 illustrate example heterogenous and texture variant object picking by the reconfigurable soft robotic gripper, in accordance with some embodiments of the present disclosure.
Figure 11:
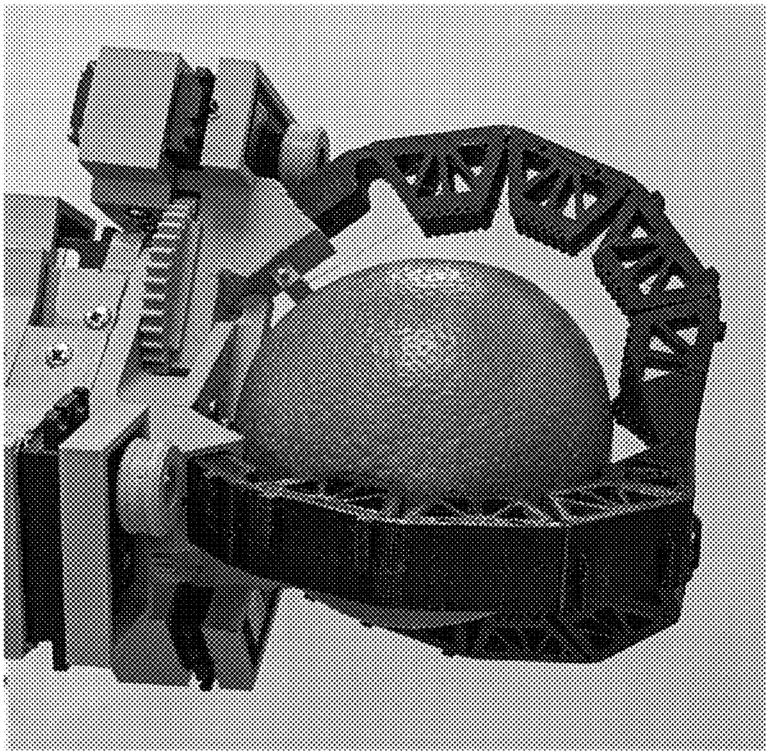

FIG. 10 and FIG. 11 illustrate example heterogenous and texture variant object picking by the reconfigurable soft robotic gripper, in accordance with some embodiments of the present disclosure. Now referring to FIG. 10, the soft robotic gripper 100 is grasping a fragile glass and in FIG. 11, the soft robotic gripper 100 is grasping an orange fruit.

Figure 12:
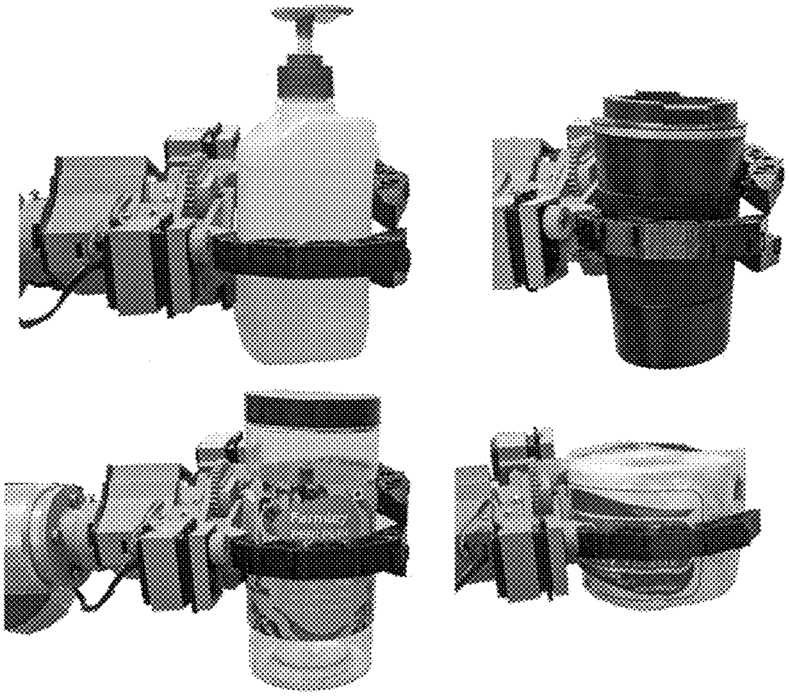
FIG. 12 illustrates example side grasps by the reconfigurable soft robotic gripper, in accordance with some embodiments of the present disclosure.
Figure 13:
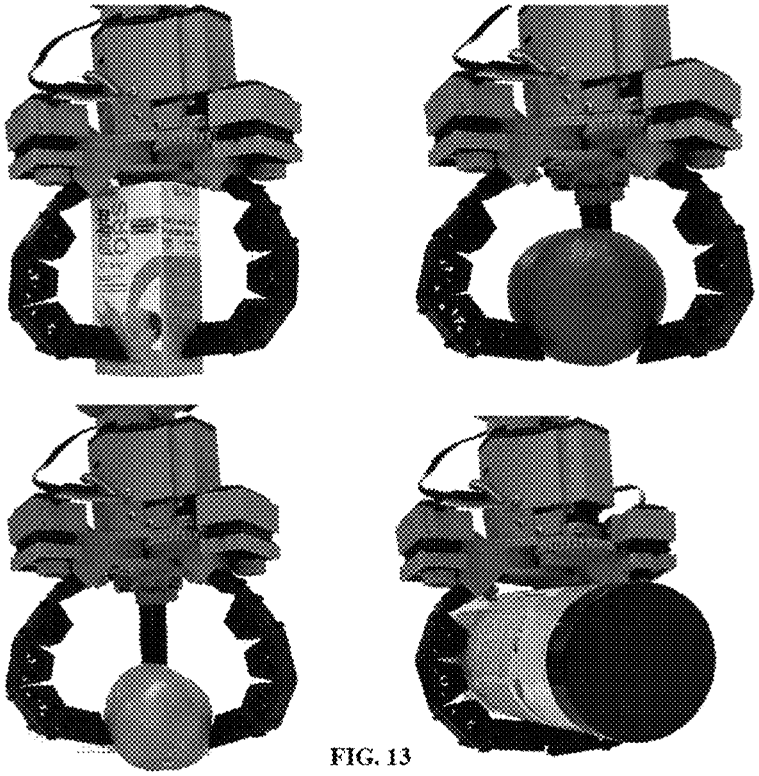
FIG. 13 illustrates example top down grasps by the reconfigurable soft robotic gripper, in accordance with some embodiments of the present disclosure.

FIG. 12 illustrate example side grasps by the reconfigurable soft robotic gripper, in accordance with some embodiments of the present disclosure. FIG. 13 illustrates example top down grasps by the reconfigurable soft robotic gripper, in accordance with some embodiments of the present disclosure.

Use case: The present disclosure can be deployed in a retail store for automated rearrangement and restocking of grocery items on a shelf. Since grocery items exist in all shapes, sizes and compliance regular rigid grippers won.t be able to grasp all such items (e.g., chips packets and vegetables will be challenging for a rigid gripper). On the other hand, regular soft grippers will also be limited to a few classes of object based on the configuration of fingers. The proposed reconfigurable soft robotic gripper 100, which can reconfigure itself based on the position of the target object, will be able to grasp and handle a larger variety of objects avoiding the need for changing the end-effector from time to time.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

The embodiments of present disclosure herein address unresolved problem of picking heterogenous objects of varying texture. The present disclosure allows the gripper to be actuated using four motors and the soft fingers to be replaced when worn out or damaged. The gripper also features onboard sensing in the form of flex sensors and camera. The flex sensors, affixed on the fingers, gives a way to estimate the instantaneous deformation of the fingers using a few measurements, this significantly reduces the computing overhead which would have been needed if motion capture-based methods were used. Incorporating a camera on the grippers enables it to be adaptive to the target object and reconfigure itself to a configuration favorable to the target object. On the software side, the RL model trained to take in the flex sensor measurements and the image and estimate the corresponding motor control signals for a reconfigurable soft gripper is a first to the best of the inventors. knowledge. These advancements are not obvious since estimating the deformation of the soft fingers using few measurements is not straight forward, as signal conditioning have to be done on the measurements which is not mentioned in related literature.

It is to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g. any kind of computer like a server or a personal computer, or the like, or any combination thereof. The device may also include means which could be e.g. hardware means like e.g. an application-specific integrated circuit (ASIC), a field-programmable gate array (FPGA), or a combination of hardware and software means, e.g. an ASIC and an FPGA, or at least one microprocessor and at least one memory with software modules located therein. Thus, the means can include both hardware means and software means. The method embodiments described herein could be implemented in hardware and software. The device may also include software means. Alternatively, the embodiments may be implemented on different hardware devices, e.g. using a plurality of CPUs, GPUs and edge computing devices.

The embodiments herein can comprise hardware and software elements. The embodiments that are implemented in software include but are not limited to, firmware, resident software, microcode, etc. The functions performed by various modules described herein may be implemented in other modules or combinations of other modules. For the purposes of this description, a computer-usable or computer readable medium can be any apparatus that can comprise, store, communicate, propagate, or transport the program for use by or in connection with the instruction execution system, apparatus, or device. The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise. Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor (s) to perform steps or stages consistent with the embodiments described herein. The term "computer-readable medium" should be understood to include tangible items and exclude carrier waves and transient signals, i.e. non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

What is claimed is:

1. A reconfigurable robotic gripper, comprising:

at least three fingers and a rigid palm, wherein the at least three fingers are attached to the rigid palm, wherein each of the at least three fingers is fully three-dimensional (3D) printed using a soft material, wherein each of the at least three fingers is actuated independently using one or more cables connected to a shaft of a motor associated with each of the at least three fingers, wherein, one among the at least three fingers is fixed, and the other fingers are movable relative to a base, wherein motion of the fingers that are movable is actuated by the associated motor, wherein each finger from among the at least three fingers comprises a plurality of flex sensors to detect a magnitude of bending, and wherein an image capturing device capable of capturing a sequence of images is attached to the base of the gripper, facing the object to be grasped.

2. A processor implemented method comprising:

receiving, by one or more hardware processors, a data pertaining to an object grasping environment, wherein the data comprises a current sequence of images pertaining to an object to be grasped, a plurality of sensor data associated with the plurality of flex sensors mounted in a plurality of fingers of a reconfigurable robotic gripper;

computing, by the one or more hardware processors, a position the object to be grasped based on the current sequence of images pertaining to the object to be grasped;

simultaneously computing, by the one or more hardware processors, a current magnitude of bending and a current configuration associated with each of the plurality of fingers based on the plurality of sensor data;

iteratively computing, by the one or more hardware processors, an optimal grasp control signal based on the position of the object to be grasped, the current configuration and the current magnitude of bending associated with the each of the at least three fingers using a trained reward based Reinforcement Learning (RL) model; and grasping, by the reconfigurable robotic gripper, the object to be grasped based on the optimal grasp control signal, wherein gripper action is performed by actuating a motor associated to each of the plurality of fingers based on the optimal grasp control signal.

3. The processor implemented method as claimed in claim 2, wherein the RL model is trained in a simulation environment and adapted to be used in a real-world environment using one or more domain adaptation and domain randomization techniques, and wherein the RL model is a reward based optimization model.

4. One or more non-transitory machine-readable information storage mediums comprising one or more instructions which when executed by one or more hardware processors cause:

receiving a data pertaining to an object grasping environment, wherein the data comprises a current sequence of images pertaining to an object to be grasped, a plurality of sensor data associated with the plurality of flex sensors mounted in a plurality of fingers of a reconfigurable robotic gripper;

computing a position the object to be grasped based on the current sequence of images pertaining to the object to be grasped;

simultaneously computing a current magnitude of bending and a current configuration associated with each of the plurality of fingers based on the plurality of sensor data;

iteratively computing an optimal grasp control signal based on the position of the object to be grasped, the current configuration and the current magnitude of bending associated with the each of the at least three fingers using a trained reward based Reinforcement Learning (RL) model; and grasping the object to be grasped based on the optimal grasp control signal, wherein gripper action is performed by actuating a motor associated to each of the plurality of fingers based on the optimal grasp control signal.

5. The one or more non-transitory machine-readable information storage mediums of claim 4, wherein the RL model is trained in a simulation environment and adapted to be used in a real-world environment using one or more domain adaptation and domain randomization techniques, and wherein the RL model is a reward based optimization model.

* * * * *